Dec. 19, 1939.  J. M. CHRISTMAN  2,184,232
CHAMFERING MACHINE
Filed Nov. 15, 1935    2 Sheets-Sheet 1
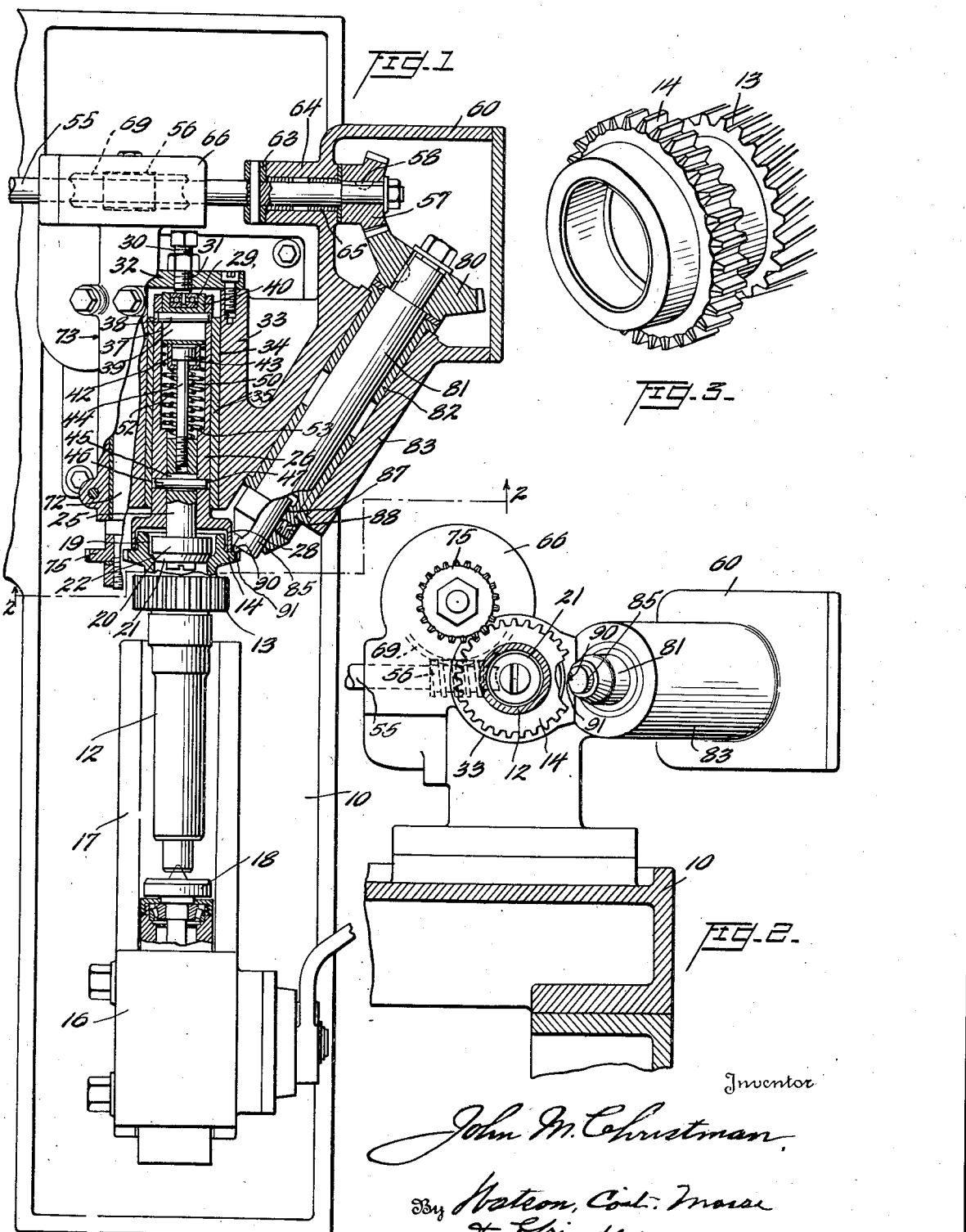
Inventor
John M. Christman
By Watson, Cole, Morse & Grindle
Attorney Dec. 19, 1939. J. M. CHRISTMAN 2,184,232
CHAMFERING MACHINE
Filed Nov. 15, 1935 2 Sheets-Sheet 2

Inventor
John M. Christman,
By Watson, Cole, Grindle
+ Grindle,
Attorney

Patented Dec. 19, 1939

2,184,232

UNITED STATES PATENT OFFICE 2,184,232

CHAMFERING MACHINE

John M. Christman, Detroit, Mich., assignor to Packard Motor Car Company, Detroit, Mich., a corporation of Michigan Application November 15, 1935, Serial No. 50,043

14 Claims. (Cl. 90—1)

This invention relates to a machine for chamfering or pointing the ends of teeth on toothed machine elements and has for its object the provision of a machine of this character which is simple to construct and operate and which will rapidly and efficiently chamfer the edges of the teeth to a desired form and remove the burrs formed during manufacture at the intersection of the working surface of the teeth with the end faces thereof.

This operation not only serves to prevent the breaking off during use of the toothed elements of small particles of metal, which is obviously highly objectionable in the event the elements are used in an automobile transmission or other closed lubricated housing, but in the case of elements which are axially shiftable into and out of mesh, such as toothed clutch elements, starter gears, or gears employed in change speed transmissions, the meshing of the gears is facilitated by the provision of cooperating chamfered or beveled edges.

The machine described herein is particularly effective in the shaping of the teeth on clutch elements such as are commonly employed for selecting the gears in variable ratio transmissions for automobiles. For example, in toothed elements of this character it is especially important that the teeth be guided into proper meshing relation with the cooperating element by the formation on the tooth ends of a very deep chamfer as distinguished from the relatively light chamfering operation effected merely for the purpose of removing burrs and rounding or flattening sharp corners at the end edges of gear teeth.

It is a feature of the invention that while the machine described herein is capable of performing either a light chamfering operation or a heavy chamfering or pointing operation, it is particularly adapted to the latter. Thus in the preferred form of the invention a cutting tool is so arranged as to effect on each engagement with the end edge of a tooth a complete cutting operation over substantially the entire depth of the tooth. Further cutting strokes on the same tooth may be effected in substantially the same manner, with the result that the finished element may be cut to any depth desired.

It is a more specific object of the invention to provide a chamfering machine employing a cutter having at least one cutting edge which is moved through a path intersecting the end edges of the teeth of a machine element, together with means for supporting and simultaneously rotating the element to present successive teeth to the action of the cutter. In the preferred form of the invention the cutter is supported for rotation on an axis transverse to or intersecting the axis on which the element is rotatably supported.

A machine of this general character is described in my prior application for Letters Patent Serial No. 756,349, the present construction being in some respects an improvement on the prior machine. For instance, it is a feature of the present invention that the moving parts of the machine need partake only of rotation on fixed axes, no bodily displacement or reciprocatory movement of the parts, other than required to feed the toothed element into the tool, being necessary. It is thus possible to increase to a very substantial extent the maximum speed at which the machine may be operated and at the same time to reduce to a minimum the vibration developed in the machine and the wear on the moving parts.

In the preferred embodiment of chamfering machine disclosed herein, the relative disposition of the tool and toothed element and the relative rates of rotation thereof are such that the tool is moved into operative chamfering engagement with different teeth during each single rotation of the tool. In other words, the tool is effective to chamfer one tooth toward the root and another tooth away from the root during a single rotation of the tool through nearly 360°, the two chamfering strokes occurring approximately at opposite phases of this rotative movement. The teeth thus chamfered on each single rotation of the tool are preferably spaced about the circumference of the element, one or more teeth intervening. On the next succeeding rotation of the tool the teeth adjacent the two teeth first chamfered are engaged by the tool, and the operation is continued until the entire series of teeth have been chamfered, one complete rotation of the element on its axis being sufficient to effect a single cut on all teeth at one side of the gear; the operation may be continued until cutting to the desired depth has been completed. Preferably the two teeth which are chamfered on each single rotation of the tool are engaged by the tool at the opposite directed end edges of the teeth.

Further objects and features of the invention will be apparent from the following description taken in connection with the accompanying drawings, in which Figure 1 is a plan view, partly in section, of a machine constructed in accordance with the invention;

Figure 2 is a sectional view taken substantially on the line 2—2 of Figure 1;

Figure 3 is a perspective view of a toothed element which has been chamfered by the machine shown in Figures 1 and 2;

Figure 4:
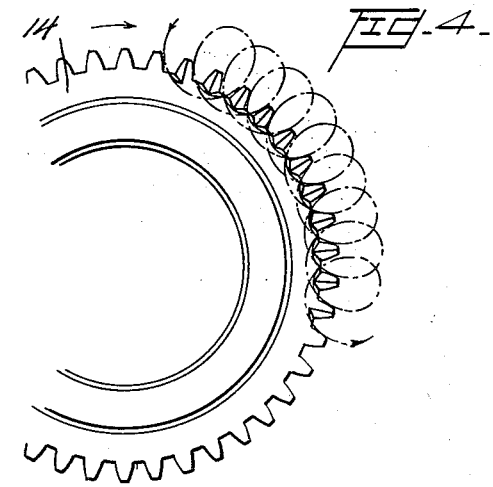
Figures 4 and 5 are diagrammatic views illustrating the manner in which the tool cooperates with the teeth and showing two different methods of procedure.

For convenience in illustrating the invention reference is made to the several embodiments thereof shown in the accompanying drawings, and specific language is used. It will nevertheless be understood that no limitation of the scope of the invention is thereby intended but that various further modifications and alterations of the illustrated structure are contemplated such as would occur to one skilled in the art to which the invention relates.

In Figure 1 the machine is illustrated as supported on a bed 10; this bed may form the usual part of any metal working machine in which provision is made to support a work-piece for rotation and which is provided with conventional means for rotating both the work-piece and a tool of some character. For instance, the bed may be that of a conventional hobbing machine. Thus the machine may be so constructed that a hobbing operation may be carried out on a gear blank at the same time that the teeth are being chamfered or pointed, the chamfering tool performing the desired cutting operations on those ends of the teeth which have been completely formed by hobbing while the hobbing operation is continued to complete the formation of the remaining portions of the teeth.

The work-piece selected for the purpose of illustrating the invention and shown herein at 12 comprises a member of a gear train commonly used in motor vehicle transmissions and includes a shaft on which are formed integrally a toothed gear 13 and a toothed positive clutch element 14, the whole being supported as a driving member for the transmission gear train, the gear 13 being employed to drive a conventional countershaft and the clutch element being engaged by a cooperating female clutch element which is axially slidable into mesh therewith to provide a direct drive. A member of this character is shown, for instance, in the patent to Jessee G. Vincent 1,901,713, granted March 14, 1933, in assembled relation with the remaining elements of a selective change speed transmission. The extent to which relative movement of the clutch elements into meshing relation is facilitated by the chamfering or pointing of the ends of the teeth on one of the elements will be readily appreciated.

It will of course be understood that no limitation of the scope of the invention is intended by the selection of this type of member for the purpose of illustration. Thus, as has already been suggested, the invention is equally applicable to the pointing of teeth on other types of clutch elements, both external and internal, and on various types of gears, and particularly spur gears, the term "toothed element" being used herein to broadly designate any such member which may be operated on and improved by the machine herein described. It will also be obvious that the machine is useful for effecting a light chamfering operation, for instance simply to remove the burrs and the sharp edges at the ends of the formed teeth.

The work-piece may be supported in any conventional manner for rotation on the axis thereof. The support may comprise, for instance, a tail stock 16 which is slidable in ways 17 secured to the machine bed, the tail stock carrying a spindle 18 which directly engages one end of the work-piece 12. At its opposite end the work-piece may be supported in a conventional chuck, but I prefer to provide a special form of centering means permitting axial feeding of the work-piece. Thus the work-piece illustrated herein is ordinarily formed with a recessed portion 19 at one end thereof, and a supporting head 20 having a beveled or conical end 21 may be received within this recessed portion 19 for frictional engagement with a complementary seat 22 formed on the work-piece. The head 20, which serves as a centering element, is secured to one end of a spindle 25 which is slidable in a sleeve 26, the latter having at one end an annular flange 28 within which is received the recessed portion 19 of the work-piece, the flange 28 and sleeve 26 acting as a guard for the centering element and as an abutment or stop to limit axial feeding of the work-piece, as hereinafter explained. At its opposite end the sleeve 26 carries a thrust bearing 29 engaging a bolt 30 which is adjustably received in the threaded opening 31 of a closure plate 32. The plate 32 is secured to a casting 33 which is mounted on the machine bed 10 and which is provided with a cylindrical recess 34 having a bushing 35 in which the sleeve 26 is slidably and rotatably mounted. A pin 37 which is inserted in apertures 38 in the wall of the sleeve 26 extends through and lies within a slot 39 formed in a member 40, the latter being slidable with the sleeve and serving as a retainer for the thrust bearing 29. A generally cup-shaped element 42 abuts against one end of the member 40, and the head 43 of a spindle 44 is slidably received within the element 42. The spindle 25 is slotted as indicated at 45 to receive a pin 46, the latter extending into apertures 47 in the wall of the sleeve 26, and the spindles 44 and 25 are threaded together for unitary axial movement. A coil spring 50 surrounding the spindle 44 engages the element 42 to retain the same against the adjacent end of the member 40, this spring reacting against the spindle 25. A coil spring 52, considerably weaker than the coil spring 50, is also inserted under compression between a shoulder 53 formed interiorly of the sleeve 26 and the member 40.

It will be observed that the springs 50 and 52 maintain the member 40 and thrust bearing 29 in engagement with the bolt 30 and serve to yieldingly urge the spindle 44 and the sleeve 26 toward the work-piece. Thus the work-piece may be readily engaged within the flange 28 and against the head 20; as the tail stock 16 is moved toward the chuck, the elements of the chuck which engage the work-piece will be displaced against the action of the springs 50 and 52. The spring 50 is of sufficient strength to ensure adequate frictional contact between the supporting head 20 and the work-piece so that the latter will be accurately centered on its axis and retained against lateral displacement during the cutting operation.

While the work-piece may be rotated by the supporting means disposed at either end thereof, I prefer to rotate the work-piece separately, for instance by direct engagement between a gear of a rotating train and the toothed element 14 which is being chamfered.

Thus, the machine may be provided with a rotating drive shaft 55 on which is secured a worm 56 and a beveled gear 57, the latter being keyed as at 58 to one end of the shaft 55 and being disposed within a gear housing 60 which may be formed integrally with the casting 33. A thrust collar 63 pinned to the shaft 55 may engage one end of a boss 64 formed on the housing 60 to resist axial movement of the shaft in one direction, and the shaft 55 may be journalled as at 65 in the boss 64.

The casting 33 may also be formed to provide a gear housing 66 through which the shaft 55 extends, the worm 56 being located within the housing 66 and meshing with a worm gear 69 therein. The worm gear 69 is secured to and carried by a shaft 72 which is journalled in a sleeve 73 which may be formed integrally with the housing 66. Secured to the outer end of the shaft 72 is a gear 75 which meshes with the toothed element 14. It will be observed that as the shaft 55 is rotated, the toothed element 14 will be driven therefrom at a relatively reduced speed of rotation. Preferably the members of the gearing train which drive the toothed element 14 are rotated at a constant speed, permitting more rapid and smoother operation than would be possible with a varying speed of rotation.

The bevel gear 57 meshes with a second bevel gear 80, the latter being secured to one end of a shaft 81 which is journalled as at 82 in a boss 83 formed integrally with and projecting from the housing 60. Secured to the outer end of the shaft 81 is a tool 85; for instance the tool may be received within a cylindrical recess 87 formed in one end of the shaft 81 and retained therein by means of a set screw 88. The outer face of the tool 85 is formed to provide a projection 90 having a cutting edge 91 for engagement with the teeth of the element 14. The axes of rotation of the tool and toothed element are transversely arranged and preferably intersect.

It will be observed from the construction thus far described that when the shaft 55 is rotated, the cutting edge 91 of the tool 85 will move through a circular path and that at the same time the toothed element 14 is rotated so that the teeth thereof are successively brought into operative relation with the tool. The timed relation of rotational movement of the toothed element and the tool is such that as the cutting edge of the tool moves toward the axis of the element it engages with one end edge of a tooth and moves toward the root of the tooth, cutting a strip of metal from the tooth edge, preferably over the entire depth of the tooth. As rotation of the element 14 and the tool continue, the cutting edge of the tool is moved outwardly of the axis of rotation of the toothed element, and engages with an end edge of a second tooth, moving away from the tooth root and similarly removing metal from the edge of the tooth.

Operation of the machine is initiated by engaging the work-piece 12 with the spindle 18 and displacing the latter along the ways 17 until the opposite end of the work-piece engages the annular flange 28 and the head 20, which accurately centers the toothed element 14, it being observed that the flange 28 forms a guard about the centering element to prevent metal chips and other foreign matter from entering between the centering element and the work-piece and thereby disturbing the proper position of the latter. Movement of the spindle 18 along the ways 17 is continued, the element 20 and the annular flange 28 being displaced with the work-piece against the action of springs 50 and 52 until the toothed element 14 is in position suitable for the taking of an initial cut on the ends of the teeth thereof. It is preferred to introduce the work-piece in the machine while the latter is being driven so that stopping and starting of the machine may be avoided, and to facilitate this operation the ends of the teeth of the gear 75 are preferably pointed, for instance by the use of a machine such as that described herein, so that the teeth of the element 14 may be readily moved into meshing relation therewith while the gear 75 is rotating.

A cut of considerable depth is usually required and thus it is necessary to feed the work-piece axially, preferably after each complete rotation of the work-piece, a sufficient number of cuts being thus taken on the end of each tooth of the element 14 to provide the final depth of cut. In the event a clutch element such as that shown at 14 is being pointed, it is found that three complete cuts on the end of each tooth will usually suffice.

The nature of the support for the work-piece is such that the depth of cut may be determined in advance by adjusting the bolt 30 and thereby the position of the thrust bearing 29. Thus as the sleeve 26 and its flange 28 are displaced toward the thrust bearing 29, the pin 37 carried by the sleeve 26 is moved in the slot 39 toward and into engagement with the member 40 at the end of the slot, in which position it is shown in Figure 1 of the drawings. This represents the extreme limit of displacement of the sleeve 26, and no further axial feeding of the work-piece is possible. When this position is reached, the teeth of the element 14 have been pointed or chamfered to the extent required. It will be observed that as shown in Figure 1 the head 20 or centering element remains firmly engaged with the work-piece by the spring 50 so that the toothed element 14 is properly centered on its axis of rotation during its entire operation.

Figure 5:
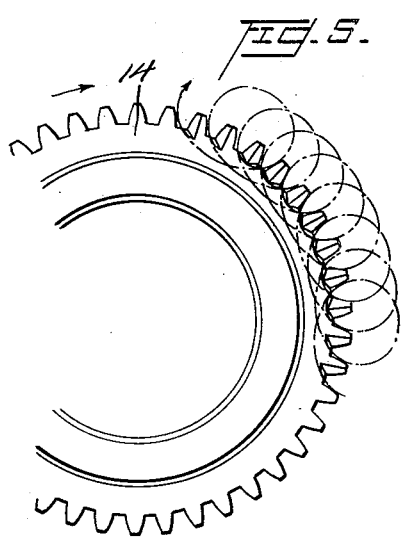

Figures 4 and 5 indicate alternative methods of chamfering. Thus in Figure 4 it will be observed that as the cutting edge is rotated it first engages and chamfers one edge of a given tooth, passes over two teeth and engages with and chamfers the oppositely directed edge of the third tooth.

The operation is somewhat the same in Figure 5 with the exception that the timing is such that the tool passes over a larger number of teeth, three teeth intervening between the pair of teeth which are chamfered by a single rotative movement of the tool. With either method of procedure it will be observed that all of the tooth edges at one side of the toothed element will be subjected to a single complete cut after the toothed element has completed approximately one complete rotation on its axis. Since there are no reciprocating parts and since the only motion imparted to the elements of the machine is one of uniform rotation, the machine may be operated very rapidly and the strain applied to the working parts of the machine is reduced to a minimum.

Figure 6:
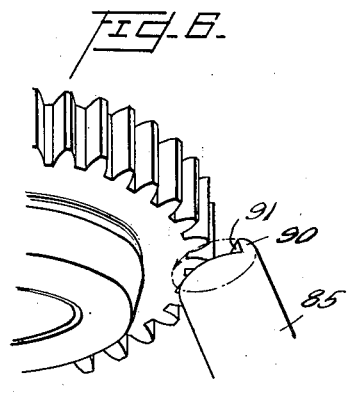
Figure 6 is a fragmentary perspective view illustrating the mode of cooperation between the tool and the teeth.
Figure 7:
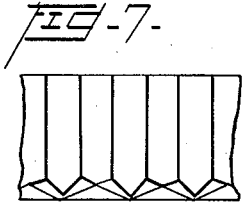
Figure 7 is a development of several teeth of which one end of each tooth has been chamfered.

Figure 6 indicates more particularly the manner in which the chamfering is effected and shows the cutting edge in the position which it occupies immediately prior to the chamfering of a tooth from the tip to the root thereof. By reason of the inclination of the axis of the shaft 81 which supports the tool toward the axis of rotation of the toothed element 14, the cutting tool will move out of engagement with the toothed element at the root of the tooth and will re-engage the toothed element adjacent the root of another tooth, moving upward along the edge thereof. In other words, in the chamfering of a spur gear, the axes of the tool and gear intersect or approximately intersect at an acute angle, and the tool engages the ends of the teeth adjacent that face of the gear which is remote from the point of intersection of the axes, so that there is no engagement of the tool with the gear face proper. The nature of the chamfer is shown more particularly in Figure 7 of the drawings.

In the case of a toothed clutch element or gear which is moved into meshing engagement in one direction only, chamfering of the teeth at both sides is not necessary. It will nevertheless be appreciated that the machine disclosed herein may readily be adapted to the chamfering of the ends of the teeth at both sides of the toothed element, it being only necessary to reverse the position of the element on its support.

Having thus described the invention, what is claimed as new and desired to be secured by Letters Patent is:

1. In a machine for chamfering toothed elements, the combination with means supporting a toothed element and a cutting tool in operative relation for rotational movement in planes intersecting at an acute angle, of means continuously rotating said element and tool in timed relation to cause said tool to engage and chamfer the end faces of the teeth of said element, said last named means comprising a driving connection between said element and tool of such ratio that during corresponding phases of successive rotations of the tool, the latter engages adjacent teeth on the element.

2. In a machine for chamfering toothed elements, the combination with means supporting a toothed element and a cutting tool in operative relation for rotational movement in planes intersecting at an acute angle, of means continuously rotating said element and tool in timed relation to cause said tool to engage and chamfer the end faces of the teeth of said element, said last named means comprising a driving connection between said element and tool of such ratio that on each rotation of the tool and during opposite phases thereof, the tool is brought into chamfering engagement with different portions of the toothed element.

3. In a machine for chamfering toothed elements, the combination with means supporting a toothed element and a cutting tool in operative relation for rotational movement about transverse substantially intersecting axes, of means continuously rotating said element and tool in timed relation to cause said tool to engage and chamfer the end faces of the teeth of said element, said last named means comprising a driving connection between said element and tool of such ratio that on each rotation of the tool and during opposite phases thereof, the tool is brought into chamfering engagement with oppositely directed end edges of different teeth.

4. In a machine for chamfering toothed elements, the combination with means supporting a toothed element and a cutting tool in operative relation for rotational movement about transverse substantially intersecting axes, of means continuously rotating said element and tool in timed relation to cause said tool to engage and chamfer the end faces of the teeth of said element, said last named means comprising a driving connection between said element and tool of such ratio that on each rotation of the tool and during opposite phases thereof, the tool is brought into chamfering engagement with oppositely directed end edges of different teeth spaced by at least two intervening teeth.

5. In a machine for chamfering toothed elements, the combination with means supporting a toothed element and a cutting tool in operative relation for rotational movement in planes intersecting at an acute angle, of means for continuously rotating said element and tool in timed relation to cause said tool to engage and chamfer the end faces of the teeth of said element, said last named means comprising a driving connection between said element and tool having a ratio such that during corresponding phases of successive rotations of the tool, the latter engages adjacent teeth on the element.

6. In a machine for chamfering toothed elements, the combination with means supporting a toothed element and a cutting tool in operative relation for rotational movement only about transverse axes, of means for continuously rotating said element and tool in timed relation to cause said tool to engage and chamfer the end faces of the teeth of said element, said last named means comprising a driving connection between said element and tool having a ratio such that during corresponding phases of successive rotations of the tool, the latter engages adjacent teeth on the element and such that during approximately opposite phases of each rotation of the tool, the latter engages oppositely directed edges of different teeth.

7. In a machine for pointing the ends of toothed elements, the combination with a support for the element, of means supporting a cutting tool for rotation about an axis transverse to the axis of the element and in operative relation therewith, said support comprising members engaging said element at opposite sides thereof, one of said members being positively displaceable axially of said element to move the latter into said tool, the other of said members comprising an abutment element and a centering element yieldably engaging said toothed element and displaceable therewith, said abutment element having limited movement axially of said toothed element whereby the depth of cut may be predetermined.

8. In a machine for pointing the ends of toothed elements, the combination with a support for the element, of means supporting a cutting tool for rotation about an axis transverse to the axis of the element and in operative relation therewith, said support comprising members engaging said element at opposite sides thereof, one of said members being positively displaceable axially of said element to move the latter into said tool, the other of said members comprising an abutment element and a centering element yieldably engaging said toothed element and displaceable therewith, said abutment element having limited movement axially of said toothed element whereby the depth of cut may be predetermined, said abutment element being formed to provide an annular portion contacting said toothed element and surrounding said centering element, whereby said centering element is shielded from cuttings at the point of engagement thereof with said toothed element.

9. In a machine for pointing the ends of toothed elements, the combination with a support for the element, of means supporting a cutting tool adjacent said toothed element and in operative relation therewith, said support comprising members engaging said element at opposite sides thereof, one of said members being positively displaceable axially of said element to move the latter into said tool, the other of said members comprising an abutment element and a centering element yieldably engaging said toothed element and displaceable therewith, said abutment element having limited movement axially of said toothed element whereby the depth of cut may be predetermined, and means for rotating said toothed element on said support.

10. In a machine for chamfering toothed elements, the combination with means supporting a toothed element to be chamfered for rotation on the axis thereof, of a cutting tool supported on an axis transverse to and substantially intersecting the axis of the element for rotation into operative chamfering engagement with the teeth of the element, and means for effecting substantially uniform rotation of said element and tool in such timed relation as to effect engagement of said tool with different teeth during opposite phases of each rotation of the tool, whereby two chamfering strokes in opposite directions are effected by one complete rotation of the tool.

11. In a machine for chamfering toothed elements, the combination with means supporting a toothed element to be chamfered for rotation on the axis thereof, of a cutting tool supported on an axis transverse to and substantially intersecting the axis of the element for rotation into operative chamfering engagement with the teeth of the element, and means for effecting substantially uniform rotation of said element and tool in such timed relation as to effect engagement of said tool with different teeth during opposite phases of each rotation of the tool, whereby two chamfering strokes in opposite directions are effected by one complete rotation of the tool, the paths of movement of the element and tool being such that on each chamfering stroke the tooth engaged by the tool is subjected to a chamfering cut over the entire depth of the tooth.

12. In a machine for chamfering toothed elements, the combination with means supporting a toothed element and a cutting tool in operative relation for rotational movement in planes intersecting at an acute angle, of means for rotating said element and tool at a uniform speed and in a constant ratio about relatively fixed axes during each complete cycle of rotational movement of the tool to cause said tool successively to engage and chamfer the end faces of the teeth of said element, said supporting means holding said element and tool against relative bodily displacement during each complete cycle of rotational movement of said tool.

13. In a machine for chamfering toothed elements, the combination with means supporting a toothed element and a cutting tool in operative relation for rotational movement in planes intersecting at an acute angle, of means for rotating said element and tool at a uniform speed and in a constant ratio about relatively fixed axes during each complete cycle of rotational movement of the tool to cause said tool successively to engage and chamfer the end faces of the teeth of said element, said last named means including a driving connection between said element and tool, said element and tool being so relatively positioned, and said driving connection having a ratio such as to cause said tool to effect successive chamfering strokes respectively toward and away from the roots of the teeth, said supporting means holding said element and tool against relative bodily displacement during each complete cycle of rotational movement of said tool.

14. In a machine for chamfering toothed elements, the combination with means supporting a toothed element and a cutting tool in operative relation for rotational movement in planes intersecting at an acute angle, of means for rotating said element and tool at a uniform speed and in a constant ratio about relatively fixed axes during each complete cycle of rotational movement of the tool to cause said tool successively to engage and chamfer the end faces of the teeth of said element, said supporting means holding said element and tool against relative bodily displacement during each complete cycle of rotational movement of said tool, said element being supported so as to be capable of axial displacement to control the depth of cut.

JOHN M. CHRISTMAN.